United States Patent [19]

Jacubasch et al.

[11] 4,085,898
[45] Apr. 25, 1978

[54] APPARATUS FOR COMMINUTION OF WELDING ELECTRODE JACKETS

[75] Inventors: Dieter Jacubasch, Eisenberg, Pfalz; Rudolf Eisenhauer, Cologne; Jüergen Greifenberg, Bensberg-Refrath; Rolf-Dieter Goebel, Cologne, all of Germany

[73] Assignee: Klöckner-Humboldt-Deutz AG, Germany

[21] Appl. No.: 712,942

[22] Filed: Aug. 9, 1976

[30] Foreign Application Priority Data

Aug. 9, 1975 Germany .............................. 2535711

[51] Int. Cl.² .............................................. B02C 17/08
[52] U.S. Cl. ..................................... 241/175; 241/179
[58] Field of Search ...................... 241/47, 69, 91, 140, 241/153, 175, 176, 177, 178, 179

[56] References Cited

U.S. PATENT DOCUMENTS

| | | | |
|---|---|---|---|
| 1,455,456 | 5/1923 | Sweet et al. ............................ | 241/91 |
| 2,681,210 | 6/1954 | Schaefer ................................. | 241/176 |
| 2,726,815 | 12/1955 | Heckett ................................. | 241/178 |
| 3,774,855 | 11/1973 | Wolf ...................................... | 241/153 |
| 3,785,575 | 1/1974 | Langmaack et al. ................. | 241/153 |

Primary Examiner—Granville Y. Custer, Jr.
Attorney, Agent, or Firm—Hill, Gross, Simpson, Van Santen, Steadman, Chiara & Simpson

[57] ABSTRACT

The jackets of rod-shaped supports, particularly jackets of welding electrodes, are removed by placing the jacketed support rods in a ball mill and grinding the jacketed rods to break up the jackets with steel rods constituting grinding members. This grinding operation takes place in a chamber having a perforate wall portion by which the broken jacket material passes and is transported, via a tube, to a fine grinder. Advantageously, the length of the container constituting the grinding chamber exceeds the length of the jacketed rods by only about 10% so that only a small axial shifting of the rods is possible and a transverse disposal of the rods is prevented. It is also expedient to fill the container to about 40% of its volume with the steel rod grinding members and to provide rapid closures for the containers for rapid charging of the jacketed rods and discharging of the dejacketed rods.

6 Claims, 6 Drawing Figures

APPARATUS FOR COMMINUTION OF WELDING ELECTRODE JACKETS

BACKGROUND OF THE INVENTION

1. Field of the Invention

The present invention relates to apparatus for release and comminution of jacket materials carried by support rods, and is particularly applicable to reclaiming the support rods and jackets of welding electrodes which have not met manufacturing requirements as finished products.

2. Description of the Prior Art

With the automated production of welding electrodes, those electrodes which do not correspond to the required dimensions or prescriptions as to quality or rejected, hereinafter called "no-go" electrodes, and constitute an appreciable loss in economy in the overall production of electrodes. It is known in the art to recover the jacket material in squeezing or striking comminution methods, however, with the disadvantage that the support rods carrying the jacket material become bent or shattered.

SUMMARY OF THE INVENTION

As the incidence of no-go electrodes becomes greater, the recovery of the support rods of such no-go welding electrodes cannot be abandoned, or refrained from, the object of the present invention is to provide apparatus for the economical recovery of both the jacket material and the rods which support the jacket material of welding electrodes.

According to the present invention, the above object is achieved in that the jacketed support rods are delivered into a mill, the jackets are released from the rods in the mill, and the dejacketed rods are discharged from the mill. The release of the jacket material in the mill is accomplished by a grinding operation hereinafter set forth in greater detail, during which operation the jacketed material is broken and continuously conveyed out of the grinding chamber for finer comminution in a further grinding chamber. The comminution operation in the ball mill advantageously takes effect only on the cylindrical jacket mass surrounding the support rods, and in this connection releases the same in a protective manner that the electrode rods are neither bent nor crushed. As the released jackets are constantly conveyed out of the grinding chamber, an acceleration of the release of the remaining jacket mass if favored by means of the oscillating movements of the grinding bodies which are constituted by elongate steel rods of substantially the same length as the jacketed rods.

For an advantageous development of the invention, it is suggested that the grinding chamber of the grinding container be filled up only to about 40% of its volume with steel rods as the grinding members. This provision causes the relative movements occurring due to oscillations between the grinding members and grinding material to be advantageously enhanced, whereby the release process of the jackets is supported and a cleaning of the rods themselves of small residues of jackets mass may be effected.

According to the invention, the apparatus comprises a ball mill having at least one pipe or tube which may be set into oscillation and which carries in the interior thereof at least one grinding container which is spaced from the inner wall of the oscillating tube for oscillation therewith. The grinding container contains rods, preferably steel rods, as the grinding members and is provided with at least one perforate wall portion having openings therein, such as in a sieve or mesh grating, for the passage of the released jacket material. The annular chamber formed between the oscillating tube and grinding container is connected by way of a conduit with a grinding container disposed thereunder for fine comminution of the jacket material. Through the spacing of the grinding container from the grinding pipe, there results a free space or chamber into which the broken up pieces of jacket material may pass and from where the transportation to the bottom of the grinding pipe follows continuously for the two grinding steps. Through the sieve-like or mesh grating provision in the wall of the grinding container, a classification takes place in such a manner that only the shell portions removed as the broken jacket drop through into the annular chamber, while the support rods themselves are retained in the grinding chamber.

For a further development of the apparatus, it is suggested, according to the present invention, that several grinding containers be provided whose length corresponds to that of the jacketed support rods. The plurality of grinding containers are arranged in series in the outer pipe or tube and, in each case, have a loading opening which is provided with a rapid closure. The length of the grinding chamber, provided in accordance with the length of the support rods of the electrodes, is advantageous in order to make possible the protective removal of the jacket without transverse disposal of the rods so that the rods are reclaimed can be used again. From this provision, however, results also the possibility of introducing several short containers in series in the axial direction in the upper grinding pipe and charging the same simultaneously. Rapid closure with eccentric levers which only need to be clamped on, ensure shortening of the charging periods substantially. If the rapid closures in the grinding containers which are arranged in series one behind the other may be displaced inwardly, not projecting beyond the diameters of the containers, there results an additional more rapid charging so that a predetermined ratio between the charge delivery and the continuous further comminution is attainable.

BRIEF DESCRIPTION OF THE DRAWING

Other objects, features and advantages of the invention, its organization, construction and operation will be best understood from the following detailed description taken in conjunction with the accompanying drawing, on which.

DESCRIPTION OF THE PREFERRED EMBODIMENTS

Figure 1:
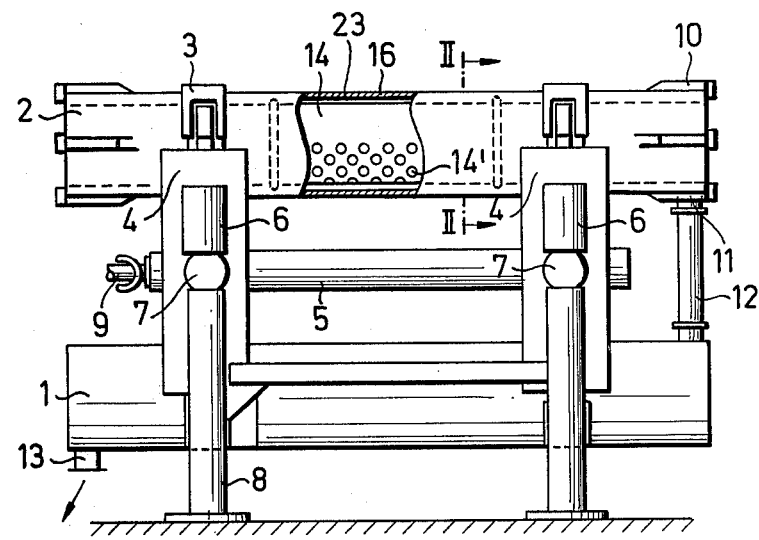
FIG. 1 is an elevational view, shown partially broken away, of a ball mill constructed in accordance with the present invention and having two grinding pipes.

A ball mill is illustrated in FIG. 1 as comprising two parallel grinding pipes 1 and 2 which are fixedly connected together by means of clamping shoes 3 with a supporting frame which consist of two arms 4 and a connecting pipe 5. At the sides of the arms 4 brackets 6 are provided through which, with an intermediate connection of rubber springs 7, the unit having the grinding containers and supporting frames is supported on a fixed frame 8 so as to be elastically oscillateable.

An oscillating drive is provided between the two pipes 1 and 2, the drive not being shown in great detail but consisting of rotatably mounted, preferably adjustable, imbalance masses, which in each case are arranged in the interior of the connecting arms 4 and which are connected with one another by means of a coupling shaft extending through the connecting pipe 5. The coupling shaft is connected in a universal type connection to a hinged shaft 9 which, in turn, is connected to a driving motor for rotating the imbalance masses.

The upper pipe 2 has adjacent one end thereof a material outlet pipe 11 through which the broken up jacket material from the rods is fed into and through a connecting pipe 12 and into the grinding pipe 1 disposed therebelow. At the opposite end of the grinding pipe 1 there is provided, on the lower side thereof, a socket or reducing pipe 13 through which the finely ground material is continuously discharged from the ball mill and supplied for reutilization.

On a portion of the upper pipe 2 in FIG. 1, the grinding pipe jacket has been broken away in order to illustrate the provision therein of grinding containers 14 constructed as insertion cylinders. It is to be understood that in this chamber or space the wall of the grinding container located in the area of the conversion of the grinding material is perforate like a metal sieve or is formed as a mesh grating. With this construction, the openings offered in this manner provide passageways for the broken up parts of the jacket material to pass into an annular chamber 23 formed by the spacing between the grinding containers and the outer pipe 2.

The grinding containers 14 are, corresponding to the lengths of the welding electrodes, shorter than the pipe 2. Therefore, several grinding containers, as illustrated in broken lines in FIG. 1, are disposed in series within the pipe 2 with spacing discs intermediate the containers.

Figure 2:
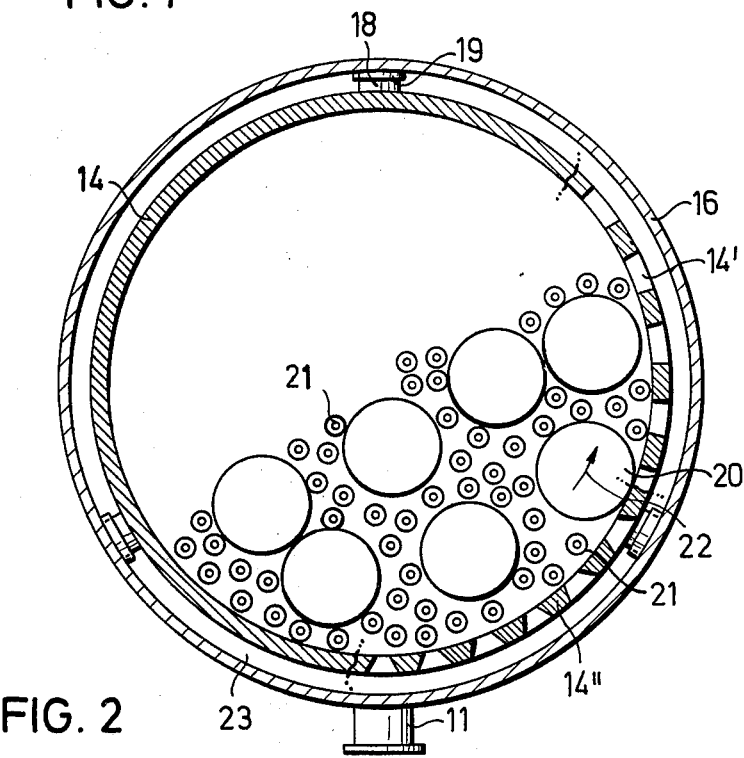
FIG. 2 is a sectional view taken substantially along the line II—II of FIG. 1 through the upper grinding cylinder and shown on an enlarged scale.

FIG. 2 is a sectional view taken through the upper pipe 2 generally along the line II—II of FIG. 1. In this connection, the pipe wall 16 is illustrated as a circular ring in which is supported the symmetrically, or asymmetrically, arranged grinding material container 14. For fastening the grinding material container, spacing members 18 are provided with supporting shoes 19. The grinding cylinder 14 is illustrated, by way of example as at 14', as including a sieve portion, or is constructed, by way of example at 14", as having a grating construction. In length, the grinding container in each case is determined according to the length of the waste electrode rod to be treated. It has been discovered that it is of advantage if the grinding container exceeds the length of the waste electrode rods by only about 10%, so that only a small axial shifting is possible and, on the other hand, a transverse disposal of the rods is prevented.

The grinding containers 14 are provided with rapid closures and advantageously so formed that they may be inserted within the grinding pipe with a spacing from the latter and that several grinding containers may be introduced successively in one pipe 2. For the equalization of different dimensions of length, suitable spacing members are added before the grinding pipes may be closed with the rapid closure clamps 10 provided at the ends of the grinding pipes.

In the grinding container 14 no-go welding electrodes 21 to be relieved of their jackets are embedded between rod-shaped grinding members 20. By means of the imbalance drive, impulses are imparted to the grinding material and directed perpendicularly to the axis of the grinding pipe. The entirety of the grinding material consisting of the no-go welding electrodes 21 and the rod-shaped grinding members 20 is moved under the effect of the eccentric drive by means of impulses taking effect perpendicularly to the axis of the grinding pipe and in a secondary circulation in the direction of the arrow 22 by which the comminution per se takes place in a generally known manner. In this connection, it is of advantage that the pieces of the broken up jacket material of the electrodes are discharged through the perforate portion of the container on the shortest path out of the grinding chamber. For this purpose, there is provided between the grinding container 14 and the pipe 2 a free space or chamber 23 in which the material knocked off is conveyed away in the pipe downwardly and in the axial direction to the material outlet pipe 11.

According to the method of the present invention, suitable grinding containers 14 are selected according to the length of the welding electrodes to be treated, and the spacing discs necessary for a positive connection filling of the pipe 2 are placed in readiness between the grinding containers. The grinding containers 14 are filled to about 40% of volume with steel rods as grinding members. In the further free space the no-go welding electrodes are inserted. After fastening of the rapid closures of the grinding containers, the containers are introduced into the grinding pipe 2, and there fastened with respect to the inner wall of the grinding pipe 2 with the aid of the spacing members 18 having the supporting shoes 19. The axial fastening takes place by means of the insertion of the necessary number of spacing discs and by means of sealing the grinding pipe rapid closure clamps 10. Through the simultaneous introduction of several grinding containers, the disadvantage of the charge wise introduction is, to a far going extent, equalized, and in addition, one set of grinding containers may be undergoing loading while another set is being utilized in the ball mill.

In addition, grinding containers may also be arranged in a satellite disc position on the illustrated upper grinding pipe. The hinge openings for charging and discharging the support rods may, however, also be advantageously provided on the cylinder wall through a folding down of a circumferential part. In this manner, an additional fastening is eliminated.

Figure 3:
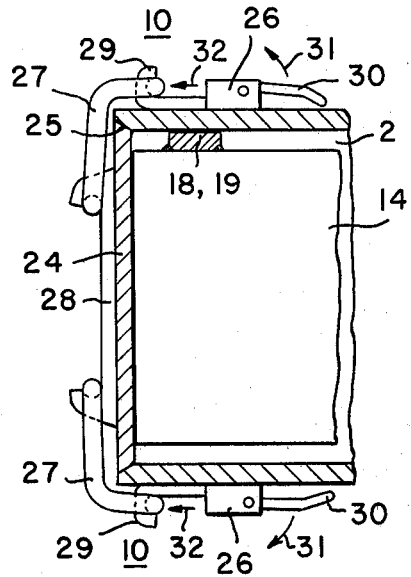
FIG. 3 is a fragmentary view of one end of the grinding pipe illustrating the rapid closure structure.

FIG. 3 illustrates an exemplary embodiment of a rapid closure 10 of the grinding pipe 2 which has a cover 24 at an open end thereof. The cover 24 is secured with its outer contours in the grinding pipe 2 with a conical construction as illustrated at 25, and is provided with handles (not shown) to facilitate removal from the grinding pipe 2. The rapid closure 10 comprises at least two lever mechanisms 26 which are fixed opposite one another on the grinding pipe, as well as two intermediary members 27 and a tension element 28. The tension element 28 is connected to the slide members 29 by way of the intermediary members 27 of the lever mechanism 26, and in this manner fixes the cover 24 in the opening of the grinding pipe 2. In the grinding pipe 2 is located, as illustrated in FIG. 1, the grinding container 14, which is fixed radially through supporting shoes 19 and supporting elements 18 and is axially fixed by way of the cover 24.

The lever 30 of the mechanism 26 is illustrated in the closed position. Rotation of the lever 30 in the direction of the arrow 31 causes a straight-line movement of the slide member 29 in the direction of the arrow 32 so that subsequently the intermediary member 27 is removed and the cover 24 may be removed.

Figure 4:
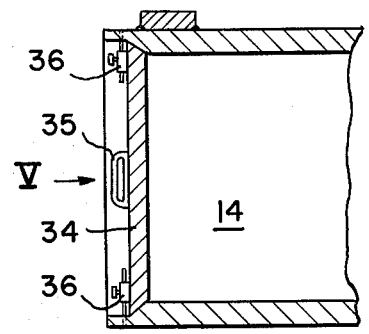
FIG. 4 is a fragmentary sectional view illustrating the rapid closure structure of a grinding container.
Figure 5:
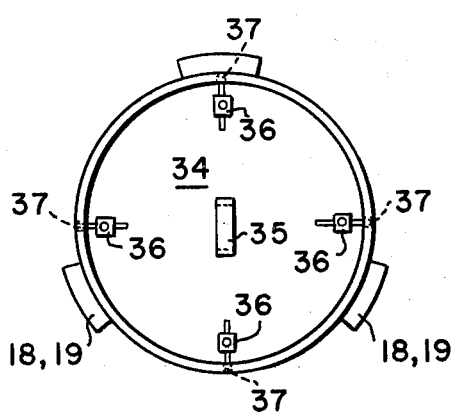
FIG. 5 is a plan view in the direction V—V of FIG. 4.

FIGS. 4 and 5 illustrate the grinding container 14 in a partial fragmentary view. The open end is closed by means of a cover 34 which is of a conical shape. The cover 34 is displaced inwardly from the end of the tube and is adapted for removal by a handle 35 and may be secured, for example, by four slide members 36 which are in releasable engagement with corresponding recesses 37 in the container.

Figure 6:
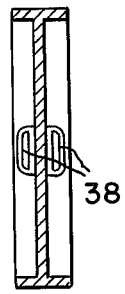
FIG. 6 is a sectional view of a spacing disc.

FIG. 6 is a detailed sectional view of an embodiment of the spacing discs which are illustrated in broken lines in FIG. 1. The discs are equipped on both sides with handles 38 for easier removal from the grinding pipe 2, and are provided with corresponding openings, not shown in the drawings, for the passage of the comminuted material discharged from the grinding containers 14.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may resonably and properly be included within the scope of our contribution to the art.

We claim:

1. Apparatus for comminuting the jacket material carried on jacket support rods, comprising: a first hollow chamber;
   oscillating means connected to said first hollow chamber for oscillating said first hollow chamber;
   a second hollow chamber for receiving the jacketed rods, said second hollow chamber removably mounted within and spaced from the inner surface of said first hollow chamber; and
   a plurality of grinding rods in said second hollow chamber for breaking up the jacket material as the first and second hollow chambers are oscillated,
   said second hollow chamber including a perforate wall portion for the passage of broken jacket material therethrough into the space between said first and second hollow chambers, and
   said first hollow chamber including a discharge opening in communication with the space between said first and second hollow chambers for passage of the broken jacket material to the exterior of said first hollow chamber.

2. The apparatus of claim 1, wherein the jacketed rods having predetermined length, and wherein the length of said second hollow chamber is no more than 10% greater than said predetermined length.

3. The apparatus of claim 1, comprising a plurality of said second hollow chambers removably mounted in series in said first hollow chamber.

4. The apparatus of claim 1, wherein said second hollow chamber includes a rapid-closure loading opening therein.

5. The apparatus of claim 1, wherein each of said chambers are in the shape of horizontally extending elongate tubes.

6. The apparatus of claim 1, comprising:
   fine grinding means connected in communication with said discharge opening of said first hollow chamber for receiving and finely grinding the broken jacket material.

* * * * *